United States Patent
Yeung et al.

(10) Patent No.: US 11,443,138 B2
(45) Date of Patent: Sep. 13, 2022

(54) SYSTEMS AND METHODS FOR VIRTUAL CAMERA CONFIGURATION

(71) Applicant: Intel Corporation, Santa Clara, CA (US)

(72) Inventors: Fai Yeung, Palo Alto, CA (US); Vasanthi Jangala Naga, Milpitas, CA (US); Gilson Goncalves de Lima, San Francisco, CA (US); Patrick Youngung Shon, Milpitas, CA (US); Yogeshwara Krishnan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 16/869,415

(22) Filed: May 7, 2020

(65) Prior Publication Data
US 2020/0265269 A1    Aug. 20, 2020

(51) Int. Cl.
*G06K 9/62* (2022.01)
*G06V 20/40* (2022.01)
*G06V 20/52* (2022.01)

(52) U.S. Cl.
CPC ......... *G06K 9/6256* (2013.01); *G06K 9/6262* (2013.01); *G06K 9/6269* (2013.01); *G06V 20/42* (2022.01); *G06V 20/52* (2022.01)

(58) Field of Classification Search
CPC combination set(s) only.
See application file for complete search history.

(56) References Cited

U.S. PATENT DOCUMENTS

| | | | | |
|---|---|---|---|---|
| 2018/0182114 | A1* | 6/2018 | Hanamoto | H04N 5/2224 |
| 2019/0068945 | A1* | 2/2019 | Maruyama | H04N 13/117 |
| 2020/0074266 | A1* | 3/2020 | Peake | G05D 1/0231 |
| 2020/0092488 | A1* | 3/2020 | Bhuruth | G06T 7/70 |
| 2020/0242471 | A1 | 7/2020 | Busch | |

OTHER PUBLICATIONS

Liu, et al., "Adaptive hierarchical multiclass SVM classifier for texture-based image classification," DBLP, Jan. 2005, pp. 1-5.
Xu, et al.,"Learning Performance of Dagsvm Algorithm Based on Markov Sampling," IEEE International Conference on Machine Learning and Cybernetics, Guangzhou, Jul. 2015, pp. 910-915.

* cited by examiner

Primary Examiner — Vikkram Bali
(74) Attorney, Agent, or Firm — Fletcher Yoder, P.C.

(57) ABSTRACT

A virtual camera configuration system includes any number of cameras disposed about an area, such as an event venue. The system also includes at least one processor and at least one non-transitory, computer-readable medium communicatively coupled to the at least one processor. In certain embodiments, the at least one non-transitory, computer-readable medium is configured to store instructions which, when executed, cause the processor to perform operations including receiving a set of game data, receiving a set of audiovisual data, and receiving a set of camera presets. The operations also include generating a set of training data and training a model based on the set of training data. The operations also include generating, using the model on a second set of game data and a second set of audiovisual data, a second set of camera presets associated with the set of virtual cameras.

13 Claims, 8 Drawing Sheets

FIG. 8

SYSTEMS AND METHODS FOR VIRTUAL CAMERA CONFIGURATION

BACKGROUND

The present disclosure relates generally to configuring virtual cameras, in particular, automatic configuration of virtual cameras using a machine learning model.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In live broadcasting of events, producers and/or directors choose camera placements and setups to provide the best possible experience (e.g., to enable a viewer to feel like they are watching the events in person) and/or views of the event based on the context of the event (e.g., a focused or zoomed in view of particularly exciting moments in the events, such as a player scoring a goal). In addition, camera operators are given instructions on how to operate the camera devices during the events. Virtual cameras can replace such camera devices and provide more varied views and volumetric video of the events. However, virtual camera positioning and configuration may be performed in a manual manner by configuring a single camera at a time using a user interface. As a result, manual operation and setup of a virtual camera system can be both costly and time-consuming.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Figure 1:
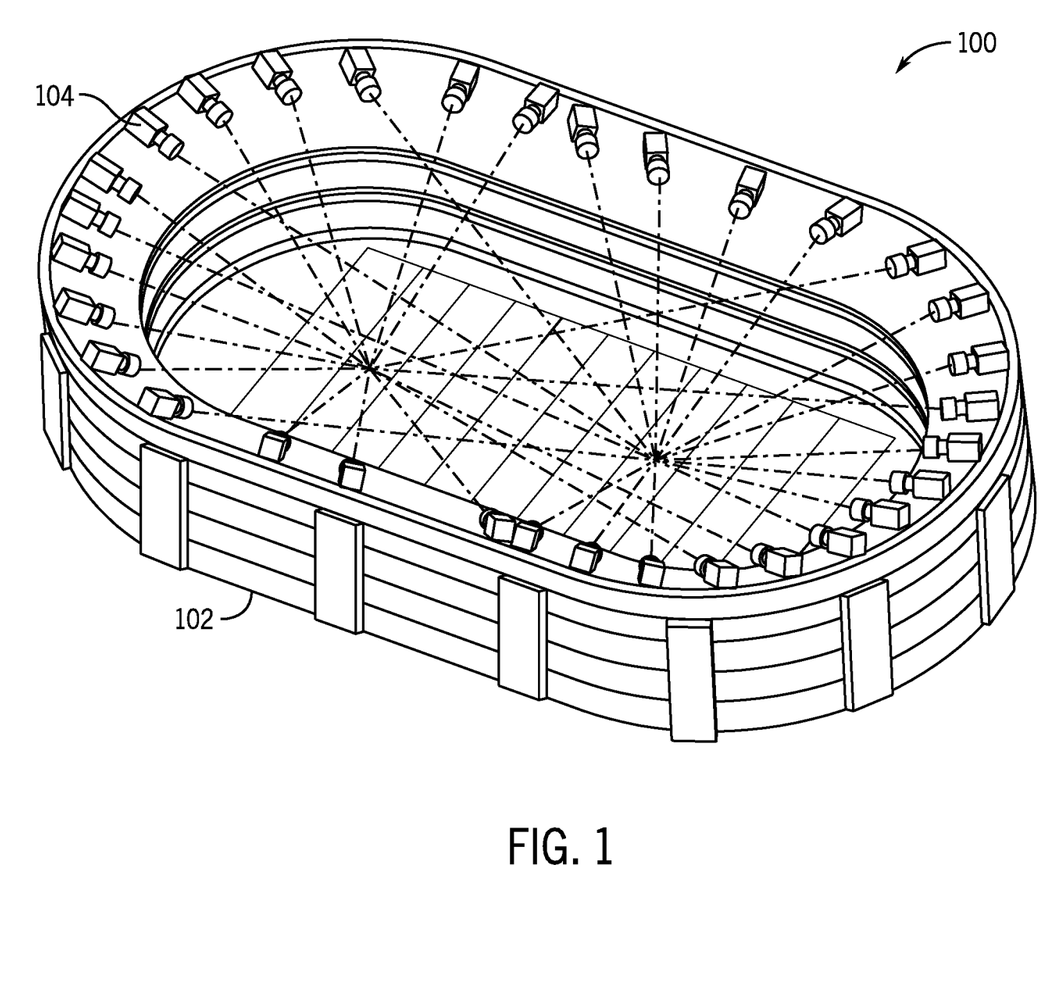
FIG. 1 is a schematic diagram of multiple cameras positioned about a venue that may provide a virtual camera system, in accordance with an embodiment of the present disclosure.

With the preceding in mind, FIG. 1 is a schematic diagram of a camera array 100 that may be used as a capture system for data acquisition used for 3D model generation in a virtual camera configuration system, as described herein. The camera array 100 may include any number of cameras 104 positioned at multiple locations about a venue 102. Each of the cameras 104 may capture images of an event (e.g., a football player catching a pass, a soccer player scoring a goal, an entertainer signing on stage) occurring in the venue 102. Computer vision algorithms applied on the data captured by the cameras 104 may capture and record audiovisual information including height, weight, depth, and other suitable attributes of individuals participating in the event and may capture audiovisual information from any number of different angles. The data, such as audiovisual information, captured by the cameras 104 may be processed and analyzed to generate a set of virtual objects. For example, the audiovisual information may be captured by the cameras 104 and may be processed to generate three-dimensional volumetric video. A virtual camera may be a virtual view of the event based on the three-dimensional volumetric video and the virtual view may be generated by processing the audiovisual information captured by the cameras 104 and generating three-dimensional virtual objects for elements on the playing field, such as the players and the ball. A virtual camera operator may choose virtual camera presets, such as camera position, camera orientation, camera focal length, camera aperture, and any other suitable camera configuration operating parameters to generate a virtual view of the event occurring in the venue 102, including parameters that may impose a specific camera movement.

Figure 2:
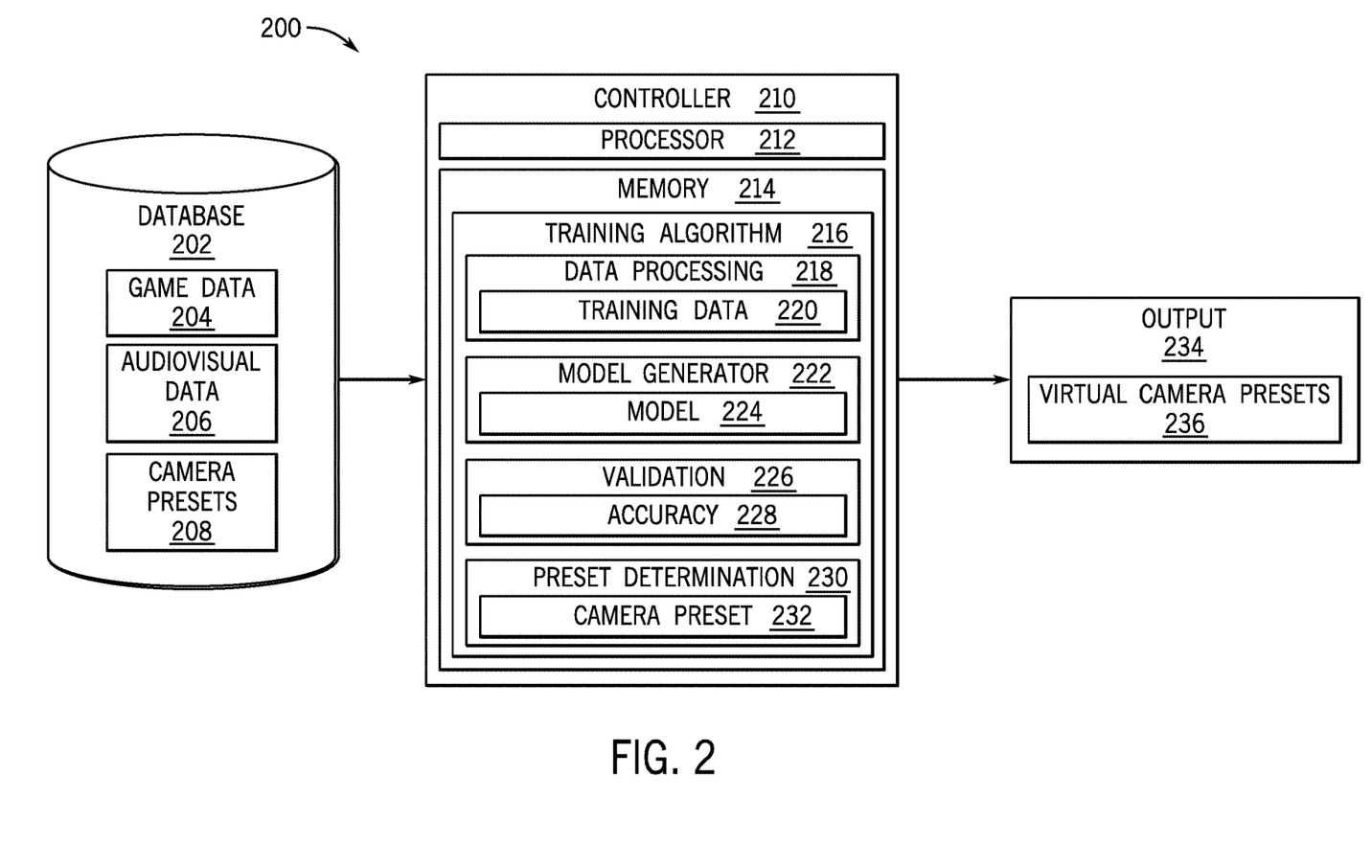
FIG. 2 is a block diagram of a virtual camera configuration system, in accordance with an embodiment of the present disclosure.

Information gathered about sports teams participating in an event may assist configuration of virtual cameras. The present disclosure provides systems and methods to automatically determine virtual camera presets by generating a machine learning model based on historical game data, broadcast camera data, audiovisual information, and/or camera locations. The machine learning model may select and generate the virtual camera presets by feeding historical game data and broadcast data about the teams involved in the event into the machine learning model. With the preceding in mind, FIG. 2 illustrates a block diagram of a virtual camera configuration system 200, according to embodiments of the present disclosure. The virtual camera configuration system 200 may determine any suitable number of virtual camera presets 236 and configure any suitable number of virtual cameras based on the virtual camera presets 236. In some embodiments, the virtual camera configuration system 200 may include a database 202 that may store a set of game data 204, a set of audiovisual data 206, and/or a set of predetermined camera presets 208. In certain embodiments, the set of game data 204 may include game statistics and/or player statistics. For example, the game statistics may include any statistics associated with a previous game or set of games and/or associated with a particular sport, such as an average number of rushing yards, average number of passing yards, average number of rushing plays, average number of passing plays, number of rushing yards for a particular game, number of passing yards for a particular game, number of rushing plays for a particular game, number of passing plays for a particular game, or any other suitable game statistic. Additionally, the game statistics may include player tracking data, such as a player formation associated with a particular play, a median player formation for a game, and/or a median player formation for a set of games. The player statistics may include any statistics associated with a particular player in a previous game or set of games, such as an average statistic or an individual game statistic associated with a particular game.

In some embodiments, the set of audiovisual data 206 may include images and audio captured by any number of cameras, such as cameras 104. The set of audiovisual data 206 may also include a set of camera usage statistics, such as a duration of use for each camera, a type of camera, and/or a set of camera actions associated with each camera. In some embodiments, the set of camera actions may include a pan, a tilt, a zoom, a focus, any other suitable camera action, and any combination thereof. In some embodiments, the set of audiovisual data 206 and the set of game data 204 may be acquired from the same event. For example, the set of audiovisual data 206 and the set of game data 204 may be associated with a prior occurring game between two sports teams. In some cases, the set of predetermined camera presets 208 may be manually determined by associating a camera preset with a camera of the set of cameras based on the set of audiovisual data 206 and/or the set of game data 204. For example, the set of predetermined camera presets 208 may include a set of physical and/or virtual camera presets, such as a camera location, a camera field of view, a target of the camera (e.g., particular player, ball), a focal length of the camera, or any other suitable camera preset.

In certain embodiments, the virtual camera configuration system 200 may include a controller 210, which may be provided in the form of a computing device, such as a personal computer, a laptop, a tablet, a mobile device, a server, or any other suitable computing device. As such, the controller 210 may include one or more general purpose microprocessors, one or more application specific integrated circuits (ASICs), and/or one or more field programmable logic arrays (FPGAs). In certain embodiments, the virtual camera configuration system 200 may train a machine learning model 224 based on the set of game data 204, the set of audiovisual data 206, and/or the set of predetermined camera presets 208.

The controller 210 may include a processor 212 communicatively coupled to the controller 210. Additionally, the processor 212 may be communicatively coupled to the database 202 and a set of sensors, such as cameras 104. The controller 210 may include receiving and conversion circuitry. The processor 212 of the virtual camera configuration system 200 may receive the set of game data 204, the set of audiovisual data 206, and/or the set of predetermined camera presets 208. In certain embodiments, the set of game data 204 and the set of audiovisual data 206 may be received during the same time period or frame.

In certain embodiments, the processor 212 may perform a training algorithm 216, which may include a set of instructions that configures and operates a set of virtual cameras. For example, the training algorithm 216 may be implemented as software stored in a memory 214 and/or a storage device of the virtual camera configuration system 200. In some embodiments, the memory 214 may include one or more tangible, non-transitory computer-readable media that store instructions executable by the processor 212 and/or data to be processed by the processor 212. For example, the memory 214 may include random access memory (RAM), read only memory (ROM), rewritable non-volatile memory, such as flash memory, hard drives, optical discs, and/or the like.

In certain embodiments, the processor 212 may generate an output 234 that includes a set of virtual camera presets 236 for configuring and operating a set of virtual cameras, by executing any suitable algorithm, such as a training algorithm 216, in response to receiving the set of game data 204, the set of audiovisual data 206, and the set of predetermined camera presets 208. The training algorithm 216 may analyze the set of game data 204, the set of audiovisual data 206, and/or the set of predetermined camera presets 208, and generate the output 234. In some embodiments, the set of virtual camera presets 236 may be used to configure operating parameters for a set of virtual cameras.

The training algorithm 216 may include a data processing component 218, a model generator component 222, a validation component 226, and a preset determination component 230. In certain embodiments, the data processing component 218 may receive and may process the set of game data 204, the set of audiovisual data 206, and/or the set of predetermined camera presets 208. The data processing component 218 may generate a set of training data 220 based on the set of game data 204, the set of audiovisual data 206, and/or the set of predetermined camera presets 208, as described further herein. The model generator component 222 may generate a machine learning model 224 based on the set of training data 220, as described further herein. The validation component 226 may evaluate and may determine an accuracy 228 of the machine learning model 224, as described further herein. The preset determination component 230 may generate a virtual camera preset 232 for configuring a virtual camera, as described further herein.

Figure 3:
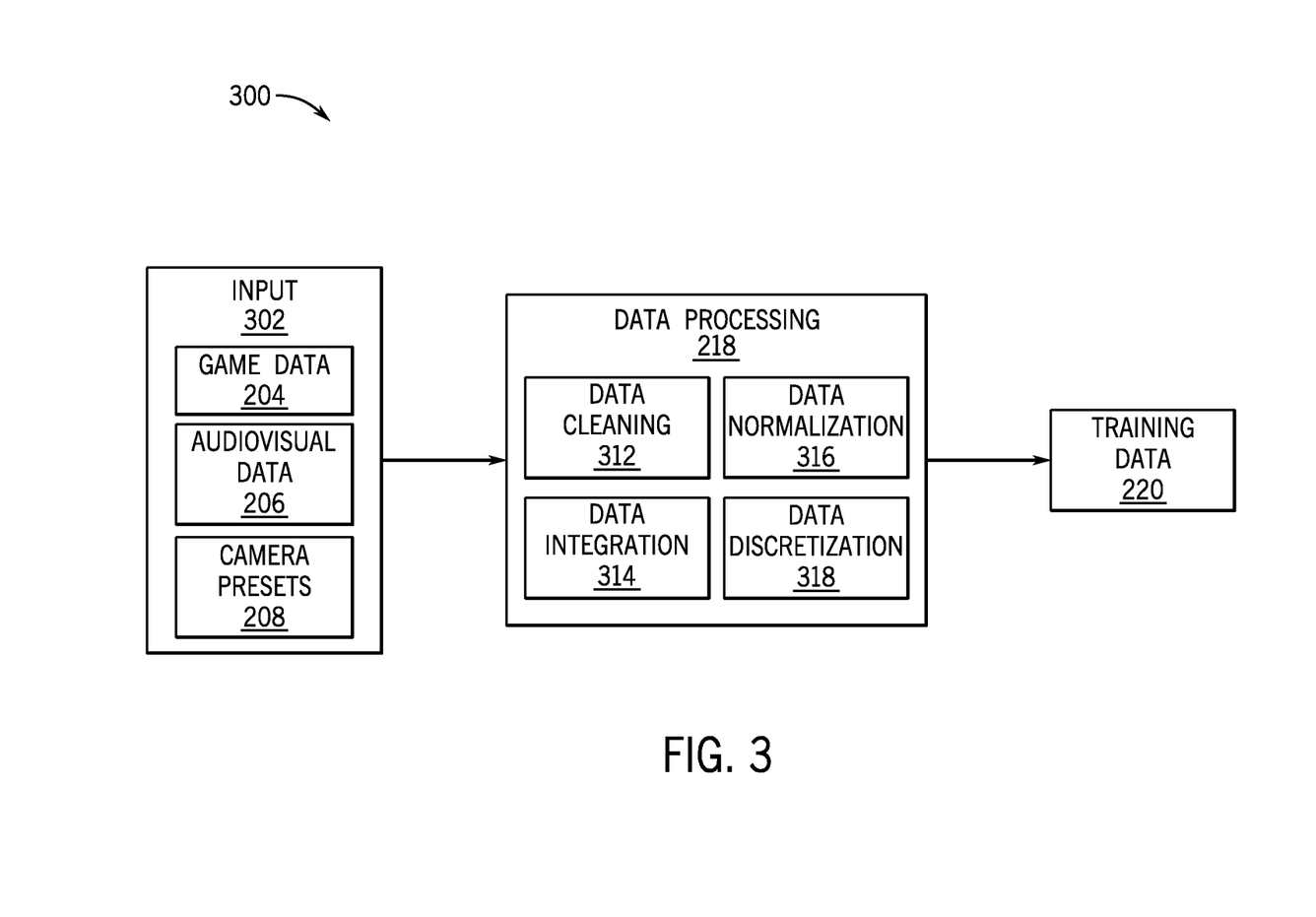
FIG. 3 is a block diagram of a data processing component for generating a training data set for virtual camera configuration, in accordance with an embodiment of the present disclosure.

The processor 212 may perform a set of data processing steps to determine a set of training data for training a virtual camera configuration model. In certain embodiments, the processor 212 may perform data cleanup, associate and/or combine input data sets, and/or normalize data to provide a relevant dataset for training the virtual camera configuration model. With the preceding in mind, FIG. 3 illustrates a block diagram 300 for a data processing component, such as the data processing component 218 of FIG. 2, of a virtual camera configuration system (e.g., the virtual camera configuration system 200), according to embodiments of the present disclosure. The data processing component 218 may receive a set of inputs 302, such as a set of game data 204, a set of audiovisual data 206, and/or a set of predetermined camera presets 208, and may generate a set of training data 220.

In some embodiments, the data processing component 218 may perform a data cleanup process 312 to resolve data inconsistencies, remove noisy data points, and/or remove outlier data points in the set of inputs 302. For example, the data processing component 218 may remove data points from the set of game data 204 which fall outside a specified or threshold range, such as one standard deviation, two standard deviations, or more, from an average statistic. In certain embodiments, the data processing component 218 may remove a minimum statistic and/or a maximum statistic from the set of game data 204. The data processing component 218 may perform a data integration process 314 to combine the various input data sets. The data processing component 218 may associate a portion of the set of game data 204 with a portion of the set of audiovisual data 206. For example, the data processing component 218 may associate a total number of passing plays in a particular game with a usage duration of a wide-angle camera for capturing large portions of the playing field. As another example, the data processing component 218 may associate a total number of running plays in a particular game with a usage duration of a narrow-angle camera for capturing smaller portions of the playing field.

In certain embodiments, the data processing component 218 may perform a data normalization process 316 to normalize the set of inputs 302 and place the data on a similar scale. The data processing component 218 may normalize the set of inputs 302 by using a normalization equation, such as $$A' = \frac{A - A_{min}}{A_{max} - A_{min}}$$

where A is the actual value of the data to be normalized, $A_{min}$ is the minimum value, $A_{max}$ is the maximum value, and $A'$ is the normalized value having a value between zero and one. In certain embodiments, the minimum value may be a minimum value of a data set, such as a minimum number of rushing yards in a particular game for any number of games. Additionally or alternatively, the minimum value may be a minimum possible value, such as zero rushing yards. In certain embodiments, the maximum value may be a maximum value of a data set, such as a maximum number of passing plays in a particular game for any number of games. Additionally or alternatively, the maximum value may be a maximum possible value, such as a maximum value for a duration of usage for a camera being a duration of an entire broadcast. In certain embodiments, the data processing component 218 may perform a data discretization process 318 to transform data from a continuous range to a discrete range. In some embodiments, the data processing component 218 may determine a set of camera locations based on the audiovisual data 206. For example, the data processing component 218 may analyze a field of view of images included in the audiovisual data 206 and determine real-world coordinates of the associated cameras. The data processing component 218 may associate the determined camera locations with the audiovisual data 206.

Figure 4:
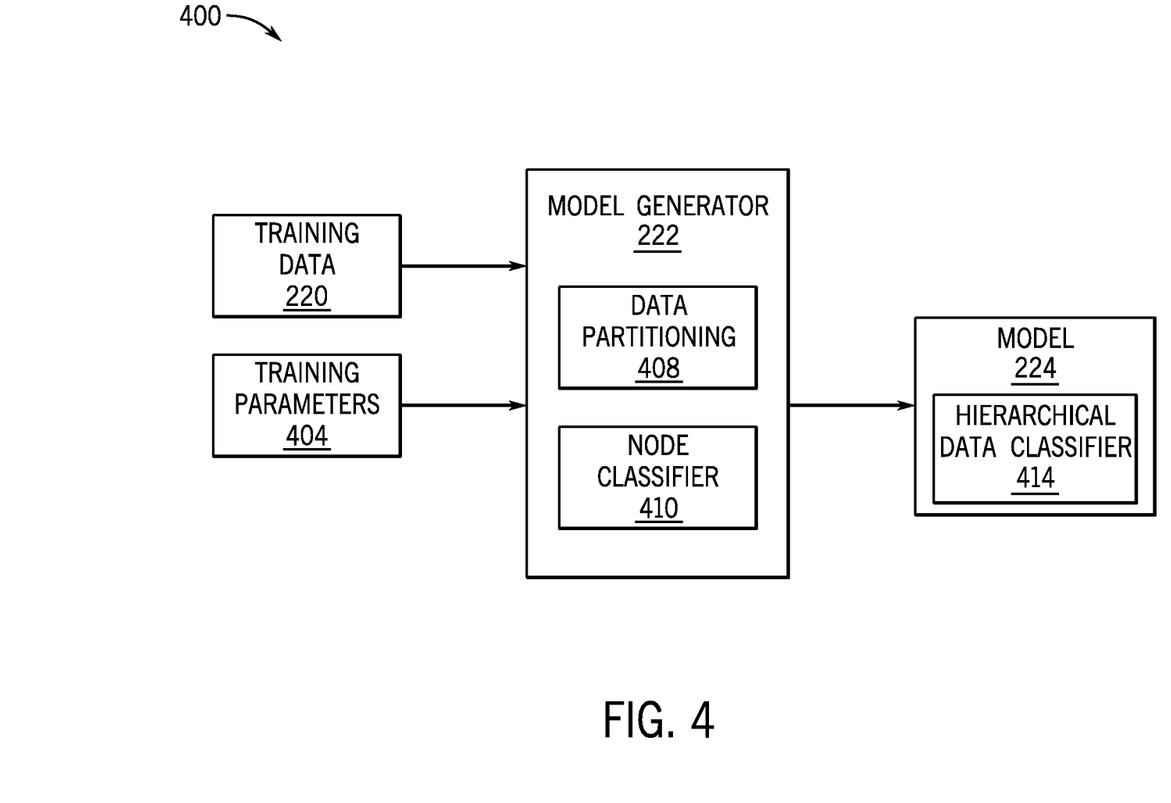
FIG. 4 is a block diagram of a model generator component for generating a data classifier, in accordance with an embodiment of the present disclosure.

In some embodiments, the processor 212 may train a machine learning model for generating and selecting appropriate camera presets based on received data. With the preceding in mind, FIG. 4 illustrates a block diagram 400 for a model generator component, such as the model generator component 222 of FIG. 2, of a virtual camera configuration system (e.g., virtual camera configuration system 200), according to embodiments of the present disclosure. The model generator component 222 may receive a set of training data 220 and a set of training parameters 404. The set of training data 220 may be the set of training data 220 generated by the data processing component 218 of FIG. 2, and the set of training parameters 404 may include the set of camera presets 208 of FIG. 2.

In certain embodiments, the model generator component 222 may generate a model 224, such as a binary classifier tree. In particular, the model generator component 222 may perform a data partitioning process 408 to divide the set of training data 220 into positive and negative samples for training the model 224. In some embodiments, the data partitioning process 408 may partition a set of input data, such as the set of input data 302, into a set of training data and a set of test data. The set of training data may be used to train the machine learning model 224 and the set of test data may be used to evaluate the machine learning model 224, as described further herein. In certain embodiments, the model generator component 222 may perform a node classifier process 410 to generate a classifier for selecting a camera preset. For example, the model 224 may include a hierarchical data classifier 414. That is, the binary classifier tree may have a node at every branch and every node may be a support vector machine (SVM) classifier. The support vector machine classifier at every node may divide two classes, each class with one or more associated camera presets.

Figure 5:
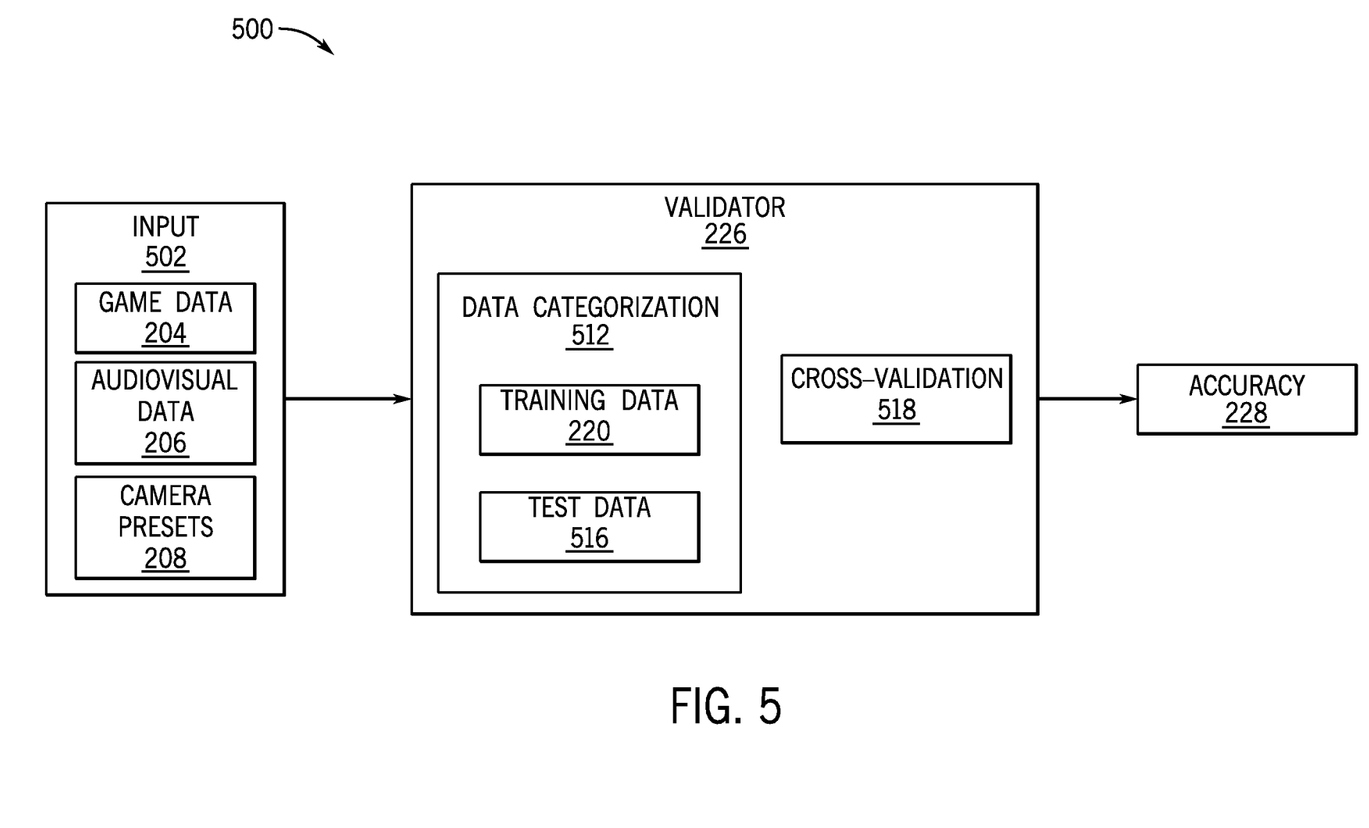
FIG. 5 is a block diagram of a validator component for determining an accuracy of a model, such as one generated by the model generator component in FIG. 4, and updating a data classifier, such as the data classifier in FIG. 4, in accordance with an embodiment of the present disclosure.

In certain embodiments, the processor 212 may evaluate an accuracy of the generated model from the model generator component 222 of FIG. 2. For example, the processor 212 may evaluate the accuracy using k-fold cross validation, with k-1 subsets of data being the set of training data and the remaining subset of data used to evaluate the model. With the preceding in mind, FIG. 5 illustrates a block diagram 500 for a validator component, such as the validator component 226 of FIG. 2, of a virtual camera configuration system (e.g., virtual camera configuration system 200), according to embodiments of the present disclosure. The validator component 226 may receive a set of input data 502, including a set of game data 204, a set of audiovisual data 206, and/or a set of predetermined camera presets 208. The set of input data 502 may be the set of input data 302 in FIG. 3. The validator component 226 may perform a data categorization process 512 on the set of input data 502 to generate a set of training data 220 and a set of test data 516. In some embodiments, the validator component 226 may separate the set of input data 502 into any suitable number of subsets. For example, the generated set of test data 516 may have any number of subsets for evaluating an accuracy of the generated model. In certain embodiments, the validator component 226 may shuffle the set of input data 502 to randomize an order or sequence of the set of input data 502 as part of the data categorization process 512.

In some embodiments, the validator component 226 may perform a cross-validation process 518 to evaluate an accuracy of the generated model, such as the model 224 of FIG. 4. The validator component 226 may evaluate the generated model using the test data 516. The cross-validation process of the validator component 226 may compare the selected camera presets for the set of test data 516 with the set of predetermined camera presets 208 associated with the set of test data 516 to determine an accuracy of the model. For example, the validator component 226 may compare a camera position, a focal length, a camera target, a horizontal aperture, and/or a vertical aperture between the predetermined camera preset and the generated camera preset. The validator component 226 may determine an accuracy value 228 for the generated model based on the comparison. In certain embodiments, the accuracy value 228 may be a generalization error that measures how accurately a model predicts outcomes for previously unseen data, such as the set of test data 516.

Figure 6:
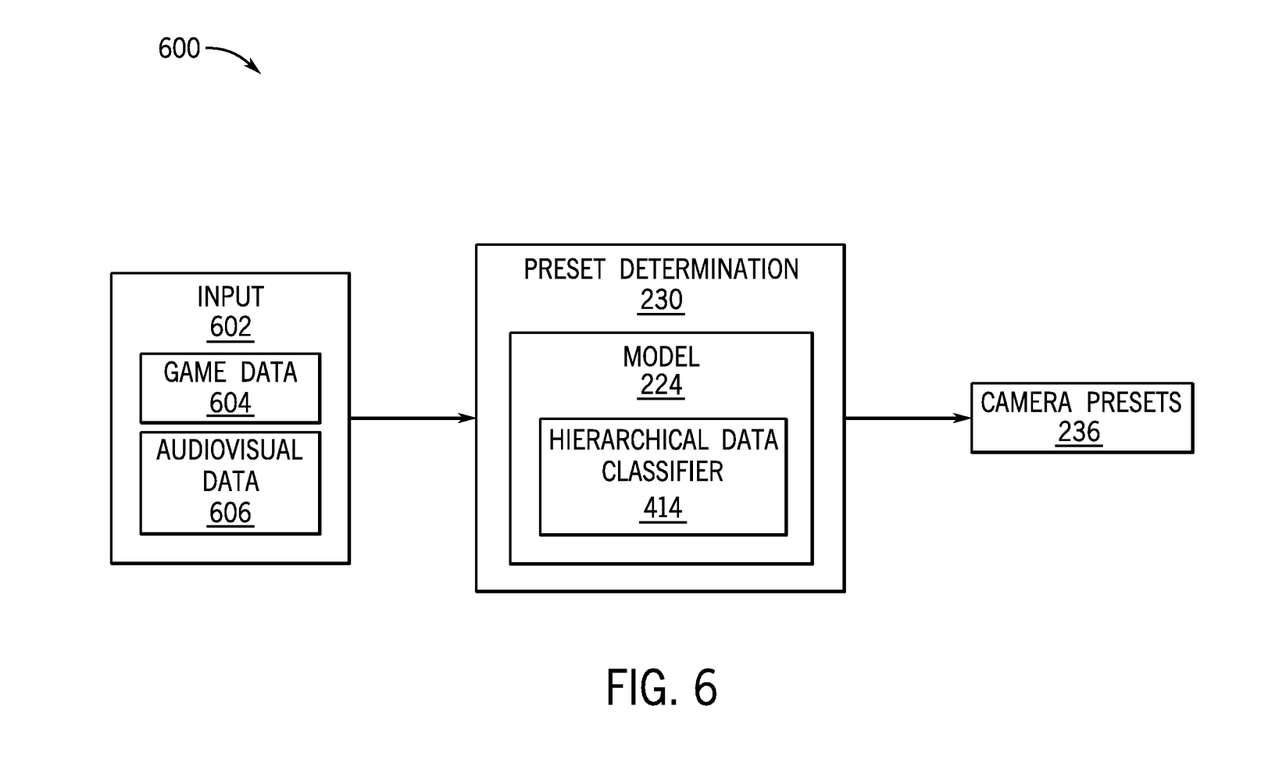
FIG. 6 is a block diagram of a preset determination component for generating a set of virtual camera presets, in accordance with an embodiment of the present disclosure.

In certain embodiments, the processor 212 may determine a set of camera presets for a new set of input data using the trained machine learning model. With the preceding mind, FIG. 6 illustrates a block diagram 600 for a preset determination component, such as preset determination component 230 of FIG. 2, of a virtual camera configuration system (e.g., virtual camera configuration system 200), according to embodiments of the present disclosure. In certain embodiments, a set of input data 602 including a set of game data 604 and/or a set of audiovisual data 606 may be input to the trained model 224, which may select and generate virtual camera presets based on the set of game data 604 and/or the set of audiovisual data 606. The preset determination component 230 may receive the set of input data 602 and the trained machine learning model 224 may select an appropriate set of virtual camera presets 614. In certain embodiments, the trained machine learning model 224 may include a hierarchical data classifier 414 having a binary tree structure that performs a classification step at each node of the binary tree. Each node of the binary tree may be associated with one or more virtual camera presets. At each node, the trained machine learning model 224 may classify the set of input data 602 and may determine which successive node of the binary tree correlates with (e.g., more closely matches) the set of input data 602. The preset determination component 230 may continue through the binary tree structure until reaching a node associated with a single virtual camera preset. The preset determination component 230 may select the virtual camera preset and may configure a virtual camera with the selected virtual camera preset. In certain embodiments, the preset determination component 230 may receive additional sets of input data and may select additional virtual camera presets using the trained machine learning model 224.

Figure 7:
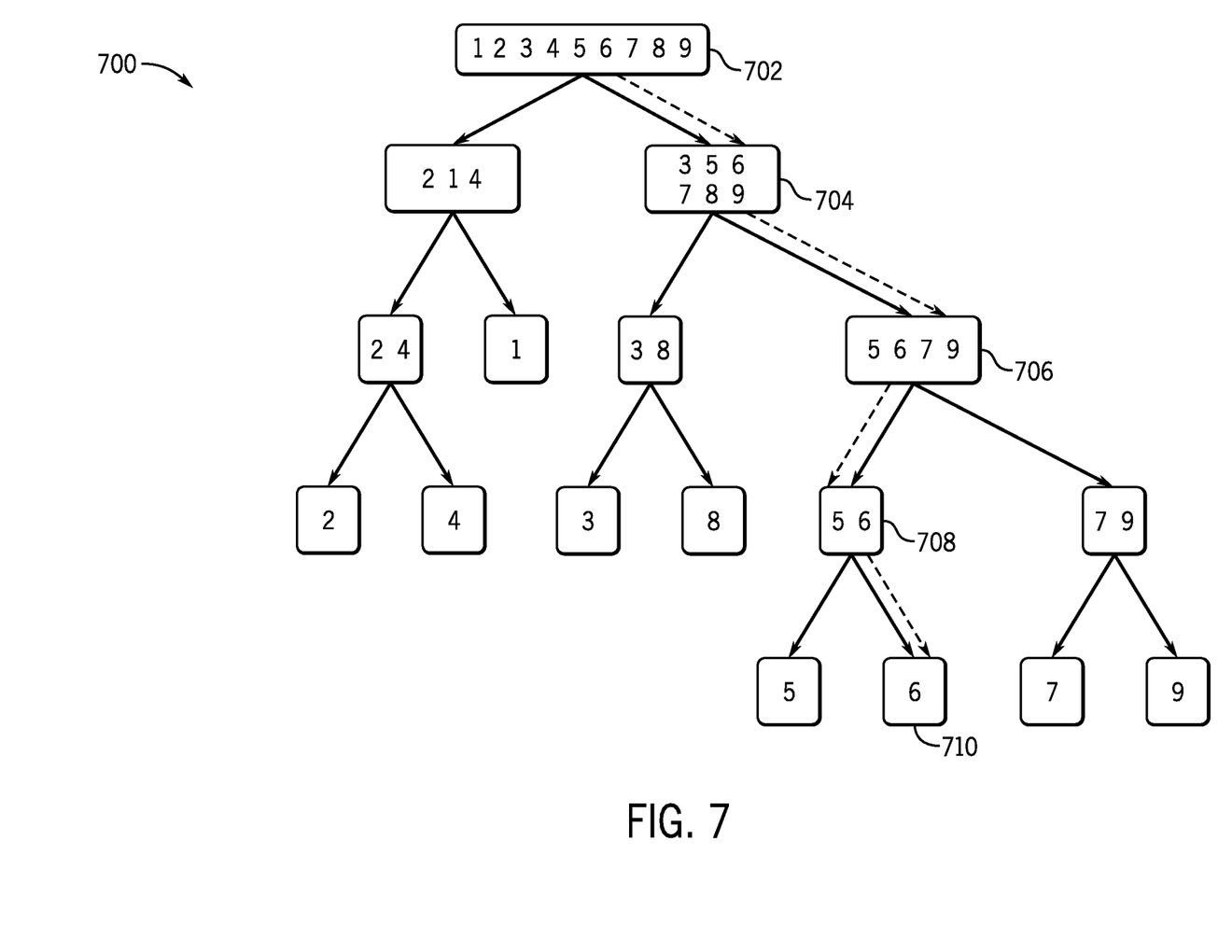
FIG. 7 is a flow diagram of a binary classifier, in accordance with an embodiment of the present disclosure.

With the preceding in mind, FIG. 7 illustrates a flow diagram of a binary classifier 700 for determining a virtual camera preset, according to embodiments of the present disclosure. The binary classifier 700 may be a binary tree structure having a set of nodes, such as nodes 702, 704, 706, 708, 710, and each node may be an SVM classifier. The first node 702 includes nine virtual camera presets. At the first node 702, the binary classifier 700 may compare and determine whether the set of input data correlates (e.g., matches more closely) with a left or right branch of the tree structure. Each successive node of the tree structure may contain fewer virtual camera presets than a previous node.

The binary classifier 700 may determine the set of input data matches more closely with the set of virtual camera presets associated with node 704 on the right branch of the tree structure. Next, the binary classifier 700 may determine the set of input data matches more closely with node 706 on the right branch of the tree structure from node 704, reducing the potential virtual camera presets to four. The binary classifier 700 then may determine the set of input data matches more closely with the set of virtual camera presets associated with node 708, reducing the potential virtual camera presets to two. The binary classifier 700 may perform another classification step to determine the set of input data more closely matches the virtual camera preset of node 710. In certain embodiments, the processor 212 may select and may input the virtual camera preset associated with the final node to configure a virtual camera for operation.

Figure 8:
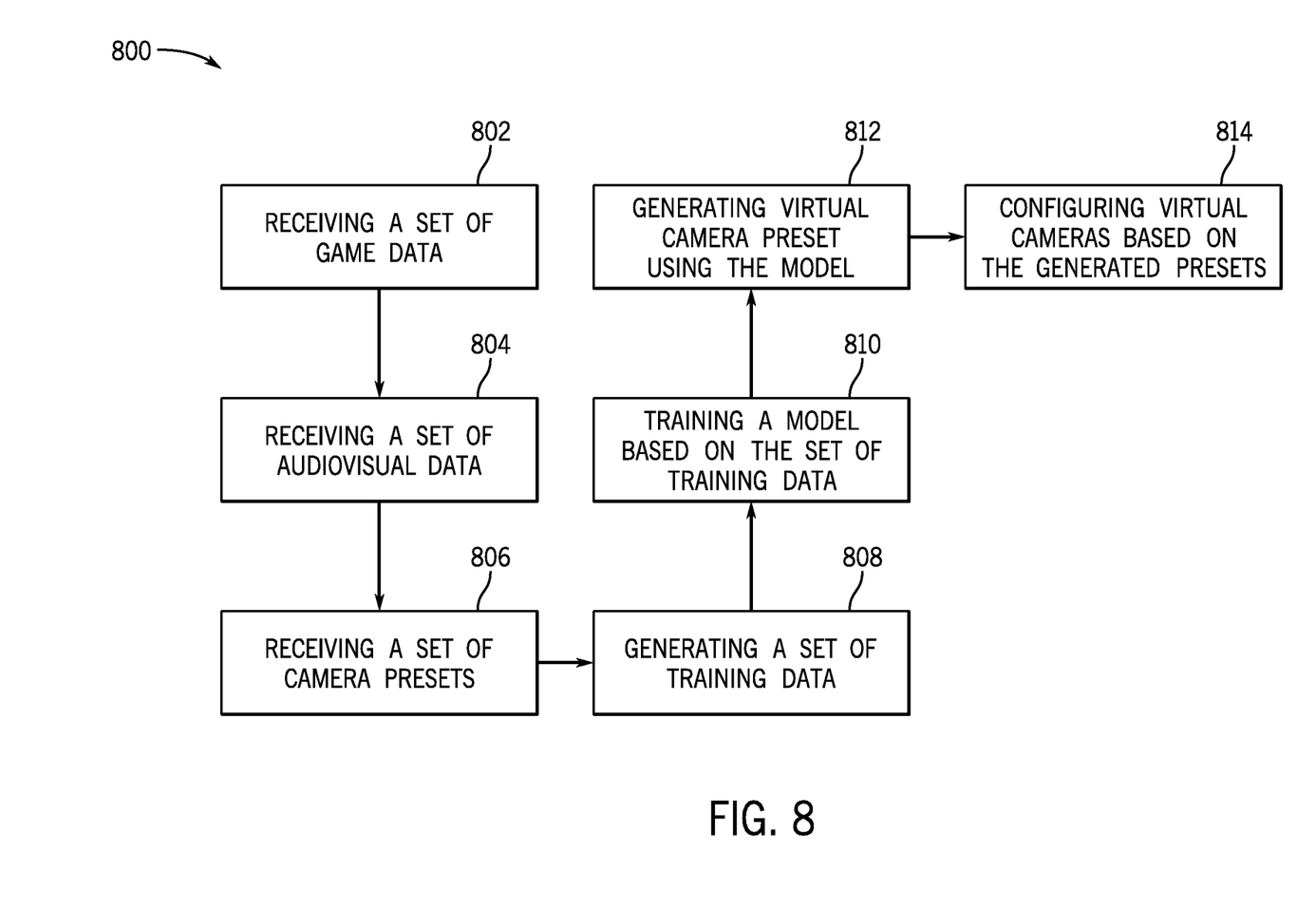
FIG. 8 is a flow diagram of a process for generating a set of virtual camera presets, in accordance with an embodiment of the present disclosure.

With the preceding in mind, FIG. 8 is a flow diagram of a process 800 for configuring a set of virtual cameras, according to embodiments of the present disclosure. While the process 800 is described as being performed by the processor 212, it should be understood that the process 800 may be performed by any suitable device that may control and/or communicate with components of the virtual camera configuration system 200, such as the processor 212 and/or the controller 210. Furthermore, while the process 800 is described using steps in a specific sequence, it should be understood that the present disclosure contemplates that the described steps may be performed in different sequences than the sequence illustrated, and certain described steps may be implemented by executing instructions stored in a tangible, non-transitory, computer-readable medium using any suitable processing circuitry, such as the processor 212 and/or the controller 210.

In this process 800, a set of game data is received at a controller (step 802), such as processor 212 of FIG. 2. In certain embodiments, the set of game data may include a set of historical game statistics and/or historical player statistics. For example, the game statistics may include any statistics associated with a previous game or set of games and/or associated with a particular sport, such as an average number of rushing yards, average number of passing yards, average number of rushing plays, average number of passing plays, number of rushing yards for a particular game, number of passing yards for a particular game, number of rushing plays for a particular game, number of passing plays for a particular game, or any other suitable game statistic. Additionally, the game statistics may include player tracking data, such as a player formation associated with a particular play, a median player formation for a game, and/or a median player formation for a set of games. The player statistics may include any statistics associated with a particular player in a previous game or set of games, such as an average statistic or an individual game statistic associated with a particular game.

Additionally, the processor 212 may receive a set of audiovisual data (step 804). The set of audiovisual data may include images and audio captured by any number of cameras, such as cameras 104 of FIG. 1. In certain embodiments, the set of audiovisual data may include previously occurring broadcast footage of events. The set of audiovisual data may also include a set of camera usage statistics, such as a duration of use for each camera, a type of camera, and/or a set of camera actions associated with each camera. In some embodiments, the set of camera actions may include a pan, a tilt, a zoom, a focus, and/or any other suitable camera action.

In the process 800, the processor 212 may receive a set of camera presets (step 806). In certain embodiments, the camera presets may be predetermined camera presets. For example, a virtual camera operator may choose virtual camera presets, such as camera position, camera orientation, camera focal length, camera aperture, and/or any other suitable camera configuration operating parameters to generate a virtual view of the event occurring in a venue. In some embodiments, the set of predetermined camera presets may include a set of physical and/or virtual camera presets.

At step 808, the processor 212 may generate a set of training data for training a machine learning model based on the set of audiovisual data and/or the set of game data. In certain embodiments, the processor 212 may perform data cleanup, associate and/or combine input data sets, and/or normalize data to provide a relevant dataset for training the virtual camera configuration model. In some embodiments, the processor 212 may perform data cleanup to resolve data inconsistencies, remove noisy data points, and/or remove outlier data points. In certain embodiments, the processor 212 may perform data integration to combine the various input data sets. For example, the processor 212 may associate a portion of the set of game data 204 with a portion of the set of audiovisual data 206.

In certain embodiments, the processor 212 may perform data normalization to normalize the set of inputs and place the data on a similar scale. For example, the processor 212 may use a normalization equation to calculate a normalized value between zero and one. In certain embodiments, the data processing component 218 may perform data discretization to transform data from a continuous range to a discrete range. Additionally or alternatively, the processor 212 may determine a set of camera locations based on the audiovisual data. For example, the processor 212 may analyze a field of view of images included in the audiovisual data and determine real-world (e.g., physical) coordinates of the associated cameras.

At step 810, the processor 212 may train a machine learning model for generating and selecting a set of camera presets based on the set of training data. In certain embodiments, the machine learning model may be a binary classifier tree. Additionally or alternatively, the processor 212 may partition a set of input data into the set of training data and a set of test data. The set of training data may be used to train the machine learning model and the set of test data may be used to evaluate the machine learning model. In certain embodiments, the model 224 may be a hierarchical data classifier 414. For example, the binary classifier tree may have a node at every branch and every node may be a support vector machine classifier. The support vector machine classifier at every node may divide two classes, each class with one or more associated camera presets At step 812, a set of virtual camera presets may be generated by supplying the trained machine learning model with a new set of input data. At each node, the trained machine learning model may classify the set of input data and may determine which successive node of the binary tree more closely matches the set of input data. The model may continue through the binary tree structure until reaching a node associated with a single virtual camera preset. The processor 212 may select the virtual camera preset and may configure a virtual camera with the selected virtual camera preset (step 814). In certain embodiments, the processor 212 may operate a virtual camera based on the selected virtual camera preset. For example, the processor 212 may process a set of audiovisual information generated by a set of cameras, such as cameras 104, and may generate a set of virtual images associated with a virtual camera. Additionally or alternatively, the processor 212 may process the set of audiovisual information and may generate a specific sequence of virtual images associated with a virtual camera action (e.g., pan, tilt, zoom, focus) in order to provide a view of the event The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS OF THE DISCLOSURE

The following numbered clauses define certain example embodiments of the present disclosure.

Clause 1

A system, comprising:

at least one processor; and at least one non-transitory computer-readable media communicatively coupled to the at least one processor, the at least one non-transitory computer-readable media storing instructions which, when executed, cause the processor to perform operations comprising:

receiving a set of game data associated with a first game statistic, a first player position, a first team formation, or any combination thereof;

receiving a set of audiovisual data associated with the plurality of cameras;

receiving a set of camera presets associated with a set of virtual cameras, the set of camera presets associated with operating parameters for the set of virtual cameras;

generating a set of training data associated with the set of audiovisual data, the set of camera presets, the set of game data, or any combination thereof;

training a model based on the set of training data; and generating, by using the model on a second set of game data and a second set of audiovisual data, a second set of camera presets associated with the set of virtual cameras.

Clause 2

The system of clause 1, wherein the instructions, when executed, cause the processor to perform the operations comprising:

generating a set of test data associated with the set of audiovisual data, the set of camera presets, the set of game data, or any combination thereof; and determining an accuracy of the model based on applying the model to the set of test data.

Clause 3

The system of clause 1, wherein the instructions, when executed, cause the processor to perform the operations comprising generating a set of validation data associated with the set of audiovisual data, the set of camera presets, the set of game data, or any combination thereof.

Clause 4

The system of clause 1, wherein the model comprises a hierarchical binary classifier.

Clause 5

The system of clause 1, wherein the instructions, when executed, cause the processor to perform the operations comprising normalizing the set of training data, wherein the normalized set of training data comprises a set of values between 0 and 1.

Clause 6

The system of clause 1, wherein the instructions, when executed, cause the processor to perform the operations comprising selecting a first camera preset from the second set of camera presets based on the second set of game data, wherein the second set of game data comprises a second game statistic.

Clause 7

The system of clause 1, wherein the first game statistic comprises average rushing yards.

Clause 8

The system of clause 1, wherein the set of audiovisual data comprises a time of use associated with at least one camera of the plurality of cameras, a set of camera actions associated with the at least one camera, a type of camera associated with the at least one camera, or any combination thereof.

Clause 9

The system of clause 8, wherein the set of camera actions comprises a pan, a zoom, a focus, a tilt, or any combination thereof.

Clause 10

The system of clause 1, wherein each camera preset comprises a location of a virtual camera, a point of view of the virtual camera, a focal length of the virtual camera, a vertical camera aperture of the virtual camera, a horizontal camera aperture of the virtual camera, or any combination thereof.

Clause 11

The system of clause 1, wherein the set of audiovisual data and the set of game data are associated with a previous event.

Clause 12

The system of clause 1, wherein the instructions, when executed, cause the processor to perform the operations comprising operating a virtual camera of the set of virtual cameras based on one of the second set of virtual camera presets.

Clause 13

The system of clause 12, wherein the instructions, when executed, cause the processor to perform the operations comprising: wherein operating the virtual camera comprises generating a sequence of images based on a third set of audiovisual data associated with the plurality of cameras.

Clause 14

A method, comprising:
receiving a set of game data associated with a first game statistic, a first player position, a first team formation, or any combination thereof;
receiving a set of audiovisual data associated with the plurality of cameras, the set of audiovisual data comprising a time of use associated with at least one camera of the plurality of cameras, a set of camera actions associated with the at least one camera, a type of camera associated with the at least one camera, or any combination thereof;
receiving a set of camera presets associated with a set of virtual cameras, the set of camera presets associated with operating parameters for the set of virtual cameras;
training a machine learning model with the set of game data, the set of audiovisual data, the set of camera presets, or any combination thereof, wherein the machine learning model comprises a binary classifier.

Clause 15

The method of clause 14, comprising determining a location of at least one of the plurality of cameras based on the audiovisual data.

Clause 16

A non-transitory, computer-readable medium comprising instructions that, when executed, are configured to cause a processor to perform operations comprising:
receiving a set of game data associated with a first game statistic, a first player position, a first team formation, or any combination thereof;
receiving a set of audiovisual data associated with the plurality of cameras, the set of audiovisual data comprising a time of use associated with at least one camera of the plurality of cameras, a set of camera actions associated with the at least one camera, a type of camera associated with the at least one camera, or any combination thereof;
receiving a set of camera presets associated with a set of virtual cameras, the set of camera presets associated with operating parameters for the set of virtual cameras;
generating a model based on the set of game data, the set of audiovisual data, and the set of camera presets;
classifying a second set of game data and a second set of audiovisual data based on the model; and
in response to the model classifying the second set of game data and the second set of audiovisual data, generating a second set of camera presets associated with a second set of virtual cameras.

Clause 17

The method of clause 16, comprising receiving a reference heap associated with a third set of sensor data, the reference heap including the reference set of qualifiers.

Clause 18

The non-transitory, computer-readable medium of clause 17, wherein the model comprises a support vector machine classifier.

Clause 19

The non-transitory, computer-readable medium of clause 17, wherein at least one camera preset of the second set of camera presets includes a target of the virtual camera.

Clause 20

The non-transitory, computer-readable medium of clause 17, wherein the model comprises a binary tree classifier.

What is claimed is:

1. A system, comprising:
   a plurality of cameras disposed about an area;
   at least one processor; and
   at least one non-transitory, computer-readable medium communicatively coupled to the at least one processor, wherein the at least one non-transitory, computer-readable medium is configured to store instructions which, when executed, cause the processor to perform operations comprising:
      receiving a set of game data associated with a first game statistic, a first player position, a first team formation, or any combination thereof;
      receiving a set of audiovisual data associated with the plurality of cameras;
      receiving a set of camera presets associated with a set of virtual cameras, the set of camera presets associated with operating parameters for the set of virtual cameras;
      generating a set of training data associated with the set of audiovisual data, the set of camera presets, the set of game data, or any combination thereof;
      training a model based on the set of training data; and
      generating, by using the model on a second set of game data and a second set of audiovisual data, a second set of camera presets associated with the set of virtual cameras.

2. The system of claim 1, wherein the instructions, when executed, cause the processor to perform operations comprising:
   generating a set of test data associated with the set of audiovisual data, the set of camera presets, the set of game data, or any combination thereof; and
   determining an accuracy of the model based on applying the model to the set of test data.

3. The system of claim 1, wherein the instructions, when executed, cause the processor to perform operations comprising generating a set of validation data associated with the set of audiovisual data, the set of camera presets, the set of game data, or any combination thereof.

4. The system of claim 1, wherein the model comprises a hierarchical binary classifier.

5. The system of claim 1, wherein the instructions, when executed, cause the processor to perform operations comprising normalizing the set of training data, wherein the normalized set of training data comprises a set of values between 0 and 1.

6. The system of claim 1, wherein the instructions, when executed, cause the processor to perform operations comprising selecting a first camera preset from the second set of camera presets based on the second set of game data, wherein the second set of game data comprises a second game statistic.

7. The system of claim 1, wherein the first game statistic comprises average rushing yards.

8. The system of claim 1, wherein the set of audiovisual data comprises a time of use associated with at least one camera of the plurality of cameras, a set of camera actions associated with the at least one camera, a type of camera associated with the at least one camera, or any combination thereof.

9. The system of claim 8, wherein the set of camera actions comprises a pan, a zoom, a focus, a tilt, or any combination thereof.

10. The system of claim 1, wherein each camera preset comprises a location of a virtual camera, a point of view of the virtual camera, a focal length of the virtual camera, a vertical camera aperture of the virtual camera, a horizontal camera aperture of the virtual camera, or any combination thereof.

11. The system of claim 1, wherein the set of audiovisual data and the set of game data are associated with a previous event.

12. The system of claim 1, wherein the instructions, when executed, cause the processor to perform operations comprising operating a virtual camera of the set of virtual cameras based on one of the second set of camera presets.

13. The system of claim 12, wherein the instructions, when executed, cause the processor to perform operations comprising:
   wherein operating the virtual camera comprises generating a sequence of images based on a third set of audiovisual data associated with the plurality of cameras.

* * * * *